United States Patent
Wittmann et al.

[11] Patent Number: 5,823,568
[45] Date of Patent: Oct. 20, 1998

[54] METHOD FOR THE ASSSEMBLY OF AN AIRBAG GENERATOR CARRIER WITH AN ASSOCIATED GAS SACK

[75] Inventors: Robert Wittmann, New-Ulm; Frank Müller, Blaustein; Serge Niederkorn, Ulm; Matin Settele, Tomerdingen; Hans-Juergen Frueth, Merklingen; Helmut Wahlers, Elterlein, all of Germany

[73] Assignee: Takata (Europe) Vehicle Safety Technology GmbH, Ulm, Germany

[21] Appl. No.: 816,716

[22] Filed: Mar. 13, 1997

[30] Foreign Application Priority Data

Mar. 14, 1996 [DE] Germany .................. 196 10 058.5

[51] Int. Cl.$^6$ .................................................. B60R 21/16
[52] U.S. Cl. .................................. 280/743.1; 280/728.1; 112/470.05
[58] Field of Search .................... 280/743.1, 728.1, 280/728.2; 112/10, 470.05

[56] References Cited

U.S. PATENT DOCUMENTS 4,798,152  1/1989  Simons et al. .................. 112/262.1
5,365,651 11/1994  Rogers et al. ..................... 29/468
5,647,289  7/1997  Young et al. ..................... 112/10

FOREIGN PATENT DOCUMENTS 295 10 775  10/1995  Germany.

OTHER PUBLICATIONS

Patent Abstracts of Japan, vol. 18, No.412 (Sep. 1992)—06 123780.

Primary Examiner—Christopher P. Ellis
Attorney, Agent, or Firm—Foley & Lardner

[57] ABSTRACT

A method for the assembly of an airbag generator carrier (11) with an associated airbag (12) consists in first sewing together the gas sack (12) until it is finished apart from a short slit (15) and subsequently checking for the presence of metal parts. Provided no metal parts are found in or on the gas sack (12) the generator carrier (11) is introduced through the short slit (15) into the interior of the gas sack (12), the sewing together of the short slit (15) then takes place subsequently while being monitored by video.

7 Claims, 2 Drawing Sheets

METHOD FOR THE ASSSSEMBLY OF AN AIRBAG GENERATOR CARRIER WITH AN ASSOCIATED GAS SACK

BACKGROUND OF THE INVENTION

The invention relates to a method for the assembly of an airbag generator carrier to an associated gas sack in accordance with the preamble of patent claim 1.

Since the generator carrier must be arranged within the gas sack, a customary technique is to sew the gas sack or bag together from individual material strips around the generator carrier which is located in its interior. In this respect, however, the problem exists that metallic parts can be deposited in or on the gas sack, for example due to damage to the needle or due to needle breakage and can injure the person who should actually be protected on the unfolding of the gas sack during an accident. For this reason, care must be taken during the manufacture of a gas sack that metallic parts deposited, for example due to needle damage or needle breakage, can be recognized so that such gas sacks can be separated our or freed from the metal parts.

SUMMARY OF INVENTION

The object of the invention is to provide a method of the initially named kind in which the undesired deposition of metal parts in the or on the gas sack can be detected, but at the same time the generator carrier which consists of metal can be introduced into the gas sack without hindering the tracking down of metal parts.

In order to satisfy this object, there are provided the features of the characterizing part of patent claim 1.

The concept underlying the invention thus consists in already fully sewing together the gas sack—apart from a short slit, which is just sufficient for the introduction of the metallic generator carrier—so that the gas sack already largely adopts the end shape. In this state the entire gas sack can be passed through a metal detecting device or can be moved past such a device, with any metal residues due to broken off needles being detected and the relevant gas sack can subsequently be separated out, or the metal remainders found can be removed. The examination of the metal residues is thus carried out in accordance with the invention before the generator carrier consisting of metal is introduced into the gas sack, because the latter would make the detection of metal residues more difficult or indeed even impossible.

Thereafter, the generator carrier is then introduced into the gas sack, which is guaranteed free of metal and already largely finished, whereupon only the very short introduction slit has to be sewn up. In order that metal parts undesirably introduced through this process into the gas sack by needle damage or needle breakage can be recognized, this sewing together takes place in accordance with the invention with monitoring, preferably video monitoring, of the sewing needles or other metal parts which come into contact with the gas sack.

After the introduction of the generator carrier and the full sewing together of the gas sack, it is thus reliably ensured that no undesired metal pieces are located in or on the gas sack which could injure an occupant in the event of triggering of the air bag arrangement.

A preferred further development of the method of the invention is characterized by claim 2.

The embodiment of claim 3 is particularly preferred because in this way the generator carrier, which has already been introduced through the short slot, can be handled without problem by means of the holder at the sewing machine which subsequently sews together the short slit, prior to the insertion of the actual generator.

A particularly preferred embodiment of the method of the invention is characterized by claim 5.

The generator carrier which is assembled with the gas sack is finally expediently introduced into a housing which can be opened and which is subsequently closed and which can be blown apart by the inflation force of the gas sack in the event of triggering of the generator.

The invention relates furthermore to a holder in accordance with claim 7 by means of which a generator carrier assembled with the gas sack can be handled without problem both during the sewing together of the short slit and also during the further installation, and indeed both by machine and also by hand.

BRIEF DESCRIPTION OF THE DRAWINGS

The invention will be described in the following by way of example and with reference to the drawings, in which are shown.

DETAILED DESCRIPTION

Figure 1:
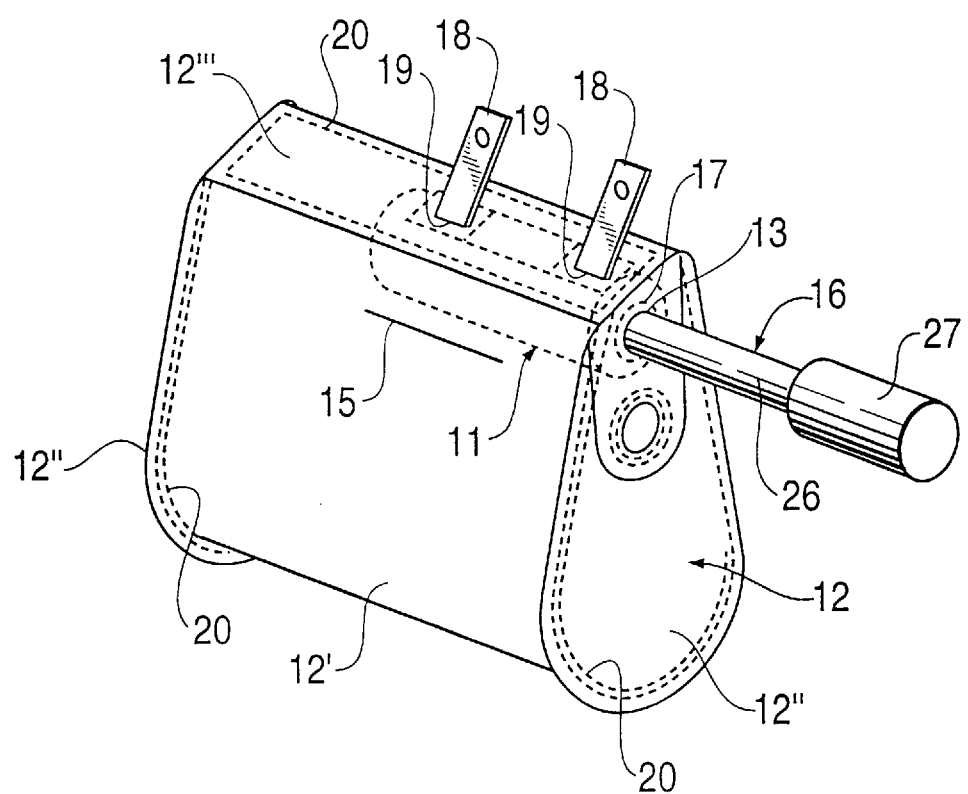
FIG. 1 a gas sack of an airbag arrangement in accordance with the invention, with a generator carrier already mounted therein, and with a holder mounted on the generator carrier, FIG. 2 a perspective view of a housing consisting of two housing halves, together with the generator carrier, which is to be accommodated in the housing via an intermediate piece, FIG. 3 a perspective view of the generator which can be introduced into the generator carrier of FIGS. 1 and 2, and FIG. 4 a perspective view of a carrier part 17 provided with a holder 16 for insertion into the generator carrier 11.

As seen in FIG. 1 an airbag arrangement in accordance with the invention has a pocket-like gas sack 12 with two substantially droplet shaped and that end faces 12" and a peripheral surface 12' which is strongly curved in the lower region. The end faces 12" and the peripheral surface 12' meet at a planar, flat side 12''' which has two slits 19 through which the attachment lugs 18 of a cylindrical generator carrier 11 pass (see also FIG. 2). The cylindrical generator is located in the interior of the gas sack 12. Opposite to the one end opening of the generator carrier 11, one end of the faces 12" of the gas sack 12 has, close to the flat end face 12''', a circular opening 13 into which the generator 14 (FIG. 3) is later inserted.

Close to the flat end face 12''' a relatively short slit 15 is located in the peripheral surface 12', with the size of the slit 15 being so dimensioned that the generator carrier with the lugs 18 can be introduced through it and transferred into the position of FIG. 1.

Figure 3:
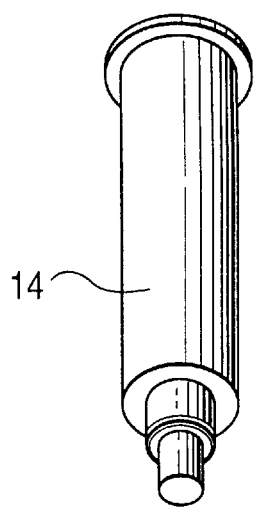
Figure 4:
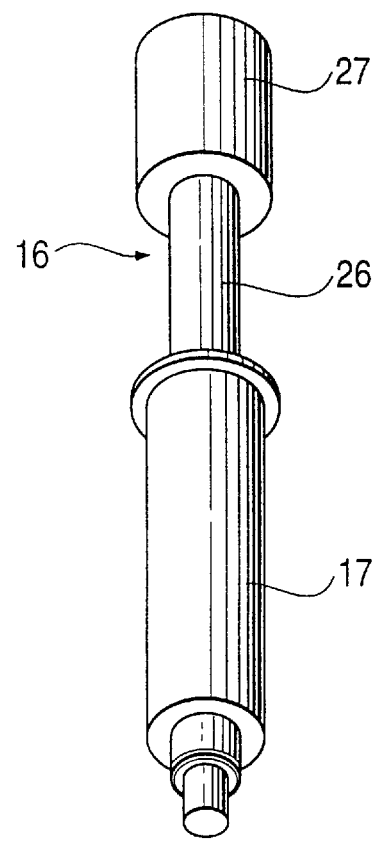

At the opening 13 in FIG. 1 there is located a holder 16 as shown in FIG. 4, which has a carrier part 17, which corresponds in shape to the generator 14 (FIG. 3). The carrier part 17 sits within the cylindrical inner space of the generator carrier 11 and is thus connected in form-fitted manner to the generator carrier 11.

The holder 16 furthermore has a holding rod 26 extending axially away from the carrier part 17, with a handle 27 at its end.

The manufacture and assembly of an airbag arrangement in accordance with FIG. 1 proceeds as follows:

First of all, the gas sack 12 is completely finished, apart from the short slot 15 in the peripheral wall 12', but without the inserted generator carrier 11, through the production of the various seams 20. In this state, the gas sack is passed to a metal detecting device, which transmits an alarm signal should any metal parts be located in or on the gas sack. These can, for example, be needles of the sewing machine which produces the seams 20 and which have been wholly or partly broken off.

If a metal part is detected in the gas sack 12, then the latter is separated out. After the finding and removal of the metal piece, the gas sack 12 can optionally be checked once again for the presence of metal parts.

As soon as a determination has been made that no metal parts are present on or in a gas sack 12, which has been finished apart from the short slit 15, then the generator carrier 11 is introduced through the short slit 15 into the interior of the housing 12, with the holding lugs 18 being passed through the slits 19 in the flat side 12''', whereupon the generator carrier 11 adopts the position which can be seen from FIG. 1.

Thereafter, the carrier part 17 having a shape which corresponds to the generator 14 is introduced through the opening 13, whereupon, in accordance with FIG. 1, the holding bar 26 with the handle 27 projects from the end face 12" of the gas sack 12, coaxial to the generator carrier 11. Through the accurately fitted arrangement of the carrier part 17 in the generator carrier 11, the generator carrier 11 including the gas sack 12 located thereon, can then be held and handled both by machine and also by hand without problem by means of the holding bar 26 and the handle or grip 27.

The gas sack 12 is then moved by means of the holder 16 to a sewing machine which sews up the short slit 15. This takes place under video monitoring of the sewing needle or needles so that it can be ensured at this stage of manufacture also that no metal parts are deposited in or on the gas bag.

Once the slit 15 has been sewn up and no needle damage or needle breakage has been detected, the carrier part 17 is removed with the holder 16 from the generator carrier 11 or from the opening 13 aligned therewith, and the generator 14 is introduced through the opening 13 into the interior of the generator carrier 11 and secured there. During this, the lugs 18 project in accordance with FIG. 1 through the slits 29 perpendicularly from the flat side 12''' of the gas sack 12.

Figure 2:
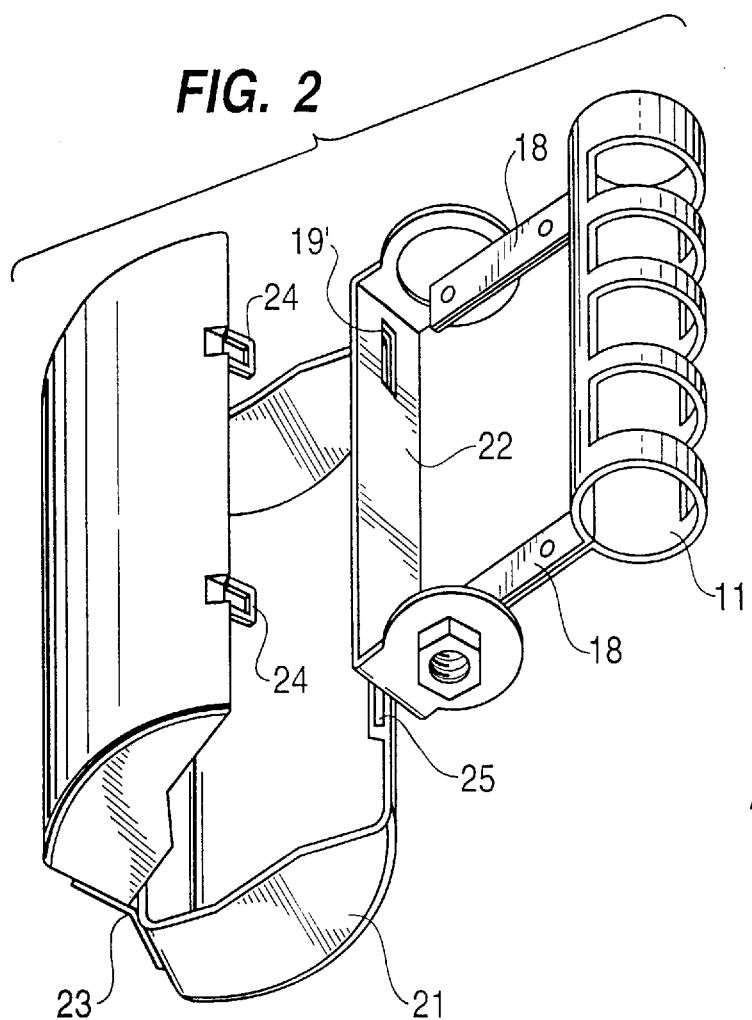

Prior to the assembly with the gas sack 12, an intermediate piece 22 shown in FIG. 2 with slits 19' complementary lugs 18 can also be mounted on the lugs of the generator carrier 11 which serves for improved holding of the generator 14 and also of the carrier part 17.

The combination generator carrier 11—generator 14—gas sack 12 is thus completed. The arrangement comprising the generator carrier 11, the gas sack 12, the generator 14 and optionally the intermediate piece 22 is then introduced into a housing 21 shown in FIG. 2 which consists of two housing halves pivotally connected to one another via a joint 23 and having hoops 24 or spring tongues 25, which are respectively arranged at their closure sides, by means of which the two housing halves can be clipped together by pivoting about the joint 23.

In the region of the joint 23 the housing has two slits, which cannot be seen in FIG. 2, through which the lugs 18 can be pushed in order to be available from the rear side of the housing for attachment purposes, for example in the backrest of a motor vehicle seat.

On assembly of the combination generator carrier 11—generator 14—gas sack 12 the gas sack 12 is folded together in a suitable manner so that it can be accommodated within the closed housing 21.

The function of the described airbag arrangement is as follows:

During an accident the generator 14 is triggered and thereby inflates the gas sack 12 surrounding the generator carrier 11, whereby the two halves of the housing 21 are pressed apart. Through a suitable design of the hoops 24 and of the spring tongue 25 a release of the connection between the two housing halves can take place, whereupon the housing opens into the position shown in FIG. 2 or further still, and releases the gas sack 12 for an inflation into the position reproduced in FIG. 1.

The airbag arrangement described with reference to FIG. 1 is particularly suited for the arrangement at a vehicle seat for the purpose of providing side support for the vehicle occupant during an accident.

REFERENCE NUMERAL LIST 11 generator carrier
12 gas sack
12' peripheral surface
12" end face
12''' flat side
13 opening
14 generator
15 short slit
16 holder
17 carrier part
18 lug
19 slit
19' slit
20 seams
21 housing
22 intermediate piece
23 hinge
24 hoop
25 spring tongue
26 holder rod
27 holding handle

We claim:

1. Method of assembling an airbag generator carrier (11) with an associated gas sack (12) which has an opening (13) for the introduction of the generator (14) into the generator carrier (11), characterized in that the gas sack (12) is completely sewn together apart from a short slit (15) for the introduction of the generator carrier (11), the gas sack (12) is exposed in this state to a metal seeking apparatus, in the case that no metal is found at the or in the gas sack (12), the generator carrier (11) is introduced through the narrow slit (15) into the gas sack (12) and is brought to its intended location within the gas sack (12); and in that the slit (15) is subsequently sewn together while monitoring for damage to the needle and/or needle breakage.

2. Method in accordance with claim 1, characterized in that the generator (14) is introduced from the outside through the openings (13) into the generator carrier (11) after the sewing up of the gas sack (12).

3. Method in accordance with claim 1, characterized in that after the introduction of the generator carrier (11) into the gas sack (12) into its desired position, a carrier part connected to a holder (16) and corresponding in shape to the generator (14) is introduced into the generator carrier (11), in that the gas sack (12) is moved up to a sewing machine by means of the holder (16) for the sewing up of the slit (15); and in that after the sewing up operation, the carrier part (17) is removed from the generator carrier (11) and replaced by the generator (14).

4. Method in accordance with claim 1, characterized in that the monitoring for damage to the needle or needle breakage during the sewing up takes place by a video camera.

5. Method in accordance with claim 1, for the assembling of a cylindrical generator carrier (11) having holding lugs (18) with a cylindrical and pocket-like gas sack (12) having a cylinder-like curved peripheral surface (12') and two approximately planar, preferably elongate end faces (12"), wherein openings for the passage of the holding lugs (18) are provided at the flat side (12''') remote from the arched peripheral surface (12') and wherein the opening (13) for the generator (14) is provided at one end face (12"), characterized in that the slit (15) is arranged in the arched peripheral wall (12') close to the flat side (12''') and preferably parallel to the latter.

6. Method in accordance with claim 1, characterized in that the generator carrier (11) assembled together with the gas sack (12) and the generator (14) is arranged in a housing (21) consisting of a plurality of housing parts which can be clipped together, with the clipped together housing parts being separable on ignition of the generator carrier (14) for the purpose of release of the inflating gas sack (12).

7. Method in accordance with claim 2, characterized in that after the introduction of the generator carrier into the gas sack into its desired position, a carrier part connected to a holder and corresponding in shape to the generator is introduced into the generator carrier; in that—gas sack is moved up to a sewing machine by means of the holder for the sewing up of the slit; and in that—after the sewing up operation, the carrier part is removed from the generator carrier and replaced by the generator.

* * * * *